Dec. 24, 1968   J. LYONS   3,418,627
DRIFT INDICATOR FOR ANCHORED BOATS
Filed June 20, 1966   2 Sheets-Sheet 1

INVENTOR.
JIM LYONS
BY
Knox & Knox

Dec. 24, 1968

J. LYONS 3,418,627

DRIFT INDICATOR FOR ANCHORED BOATS

Filed June 20, 1966

INVENTOR.
JIM LYONS

BY

Knox & Knox

United States Patent Office 3,418,627
Patented Dec. 24, 1968

3,418,627
DRIFT INDICATOR FOR ANCHORED BOATS
Jim Lyons, 5104 N. Harbor Drive,
San Diego, Calif. 92106
Filed June 20, 1966, Ser. No. 558,915
7 Claims. (Cl. 340—29)

The present invention relates to a drift indicator which will detect and signal the drift of an anchored boat into dangerously shallow water or obstructions.

The apparatus utilizes a small weight suspended on a line from the boat at a preset depth and connected directly to a simple mechanism to operate an alarm if the weight is disturbed. An alarm will be given if the line slackens, as by an ebbing tide or by the weight riding up on a shoal or beach, or if the line is pulled tight by the weight catching in an obstruction. Either will indicate a drift of the boat from its original position. The mechanism is contained in a compact housing, is simple to use and maintain, and is easily set for particular conditions of water depth and degree of sensitivity.

Prior drift indicators have utilized such devices as sea anchors, which are subject to changes in local currents and are not consistent in operation. More complex types use depth sounding means such as sonar, which requires considerable power for continuous operation and can give false alarms due to passing fish, sub-surface kelp, or similar objects. The apparatus described herein requires no power except when the alarm is in operation, and remains in constant relation to the boat regardlless of local conditions.

The basic mechanism of the apparatus and its operation are illustrated in the drawings, in which.

Similar characters of reference indicate similar or identical elements and portions throughout the specification and throughout the views of the drawing.

Figure 1:
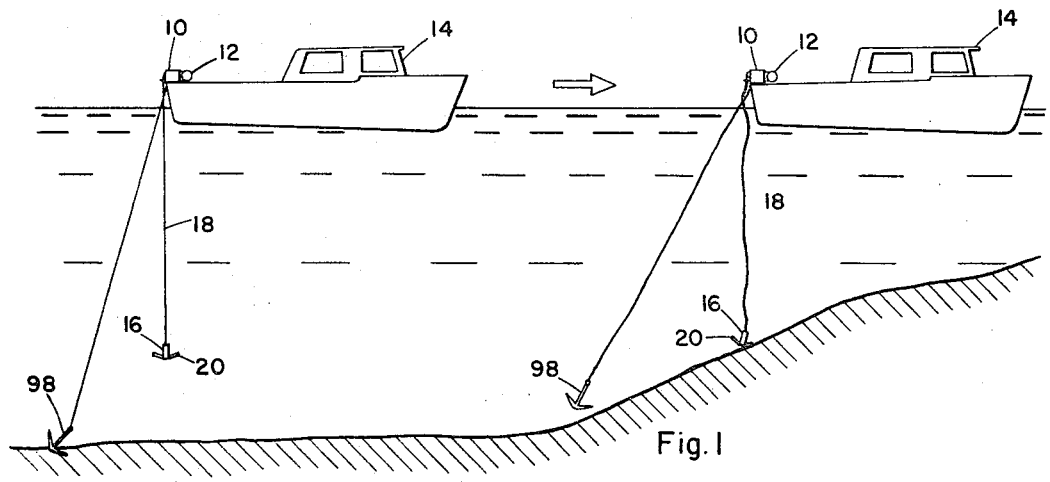
FIGURE 1 is a diagram showing a boat in two different positions to indicate the action of the apparatus.
Figure 2:
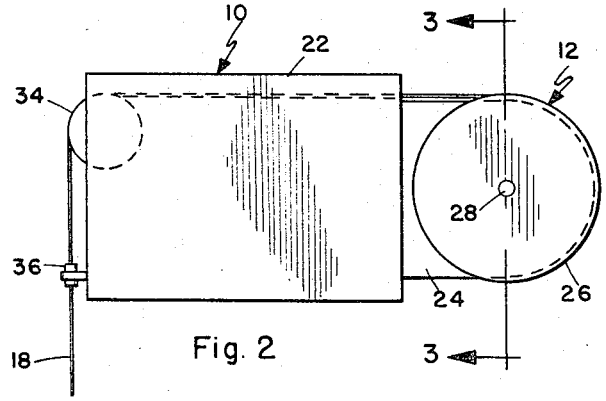
FIGURE 2 is an enlarged side elevation view of the sensing unit.

The apparatus comprises a sensing unit 10 and a small winch 12, which can be attached to the sensing unit, the assembly being mounted on a boat 14 in any suitable manner, preferably at the stern as in FIGURE 1. A weight 16 is suspended from a line 18, which is wound on winch 12, the line being of corrosion resistant material such as stainless steel stranded cable, nylon, or plastic coated wire, as thin as in practical to minimize resistance in the water. The weight 16 is provided with protruding flukes 20 in the manner of an anchor, in order to catch on any obstruction encountered and ensure operation of the alarm.

Figure 3:
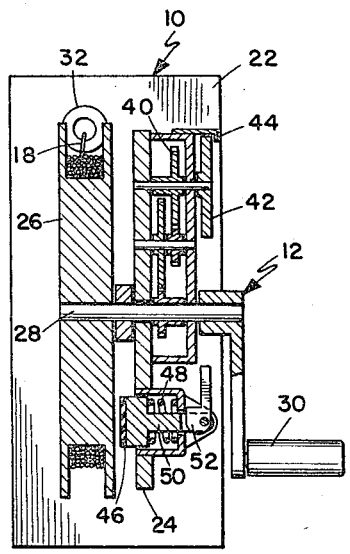
FIGURE 3 is an enlarged sectional view taken on line 3—3 of FIGURE 2.
Figure 4:
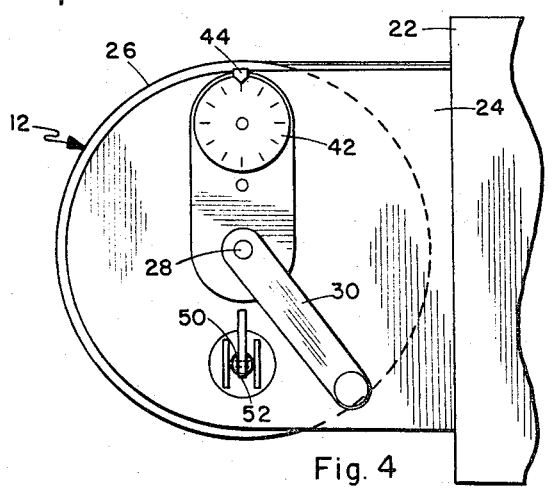
FIGURE 4 is a side elevation view as taken from the right hand side of FIGURE 3.

Sensing unit 10 is contained in a housing 22 which can be attached to the boat by brackets, clamps, or the like. Winch 12 is illustrated as mounted on one end of housing 22 and includes a mounting plate 24 extending from the housing, with a drum 26 carried on a shaft 28 which is journalled in the mounting plate. A handle 30 is secured to shaft 28 for manual rotation of drum 26, although a suitable drive motor may be used if necessary. Line 18 is wound on drum 26 and passes through a guide 32, over a freely rotatable pulley 34 and down through a further guide 36 to the weight 16. To prevent damage to the unit by excess pull on the line 18, a break link 38 is inserted in the line adjacent the weight. It is normally desirable to know the length of cable extended when in use and this can be accomplished by marking the line at intervals, or by an indicator on the winch, as in FIGURES 3 and 4. A gear train 40 driven from shaft 28 is coupled to a dial indicator 42 marked in suitable increments and provided with a pointer 44. Drum 26 is held at any required position by brake means, a friction brake being preferred so that a hard pull on line 18, but insufficient to part the break link 38 and lose the weight, can unwind some of the line to absorb the initial strain. A suitable brake illustrated comprises a brake shoe 46 mounted on plate 24 and biased by a spring 48 to bear against drum 26, the brake shoe having a stem 50 which is connected to a lever operated cam 52 to retract the brake shoe against the spring. This type of brake is well known and others may be equally suitable.

The pulley 34 is mounted in a bracket 54 on one arm 56 of a bell crank 58, which is pivotally mounted on a hinge pin 60 in the housing 22. Extending from bell crank 58 substantially opposed to arm 56 is a leaf spring 62 bearing upwardly against an adjustment screw 64 in a fixed post 66. Fixed to bell crank 58 coextensively with leaf spring 62 and spaced therefrom is a spring arm 68 which engages the actuating button 70 of a normally closed microswitch 72. When sufficient pressure is applied downwardly on pulley 34 the spring arm 68 presses up on button 70 and holds the switch in open position. Bell crank 58 has a second arm 74, opposed to arm 56, and fixed to housing 22 is a stop 76 to limit the upward swing of the arm 74. Adjacent stop 76 is a pin 78, on which is mounted a rocker arm 80 having a short end 82 which is engageable by the arm 74. The long end 84 of rocker arm 80 carries a link 86 which is engaged over the spring arm 68, to pull the spring arm down clear of button 70 when said long end is lowered. The underside of the long end 84 rests on a compression spring 88 which is adjustable by means of a set screw 90, to vary the spring pressure.

A suitable source of power, such as a battery 92, is connected through microswitch 72 to an alarm 94. To shut the apparatus off when not in use a manually operated switch 96 may be connected in series with microswitch 72. The alarm 94 may be a bell, buzzer, light or any other type of audio or visual alarm, or combination thereof, and can be located at any convenient position on the boat.

After the boat is secured by a conventional anchor 98, the apparatus is put into operation by first lowering weight 16 to the bottom of the body of water, which can be determined by slackening of the line 18. The line is then wound in a predetermined amount to raise the weight from the bottom. Alternatively the weight can be lowered to a predetermined depth which represents the minimum depth of water desirable for the boat, or the known depth of adjacent rocks or reefs. When the line is set the brake 46 is engaged to hold the winch in that position.

Adjustment screw 64 is set so that the pressure of leaf spring 62 will support slightly less than the weight 16. The weight will pull down on pulley 34 causing spring arm 68 to push button 70 up and hold microswitch 72 in the off position. By means of adjustment screw 64 the bell crank 58 is biased to a neutral position under the normal static load of the weight 16, and can move in either direction according to changes in the load.

Figure 5:
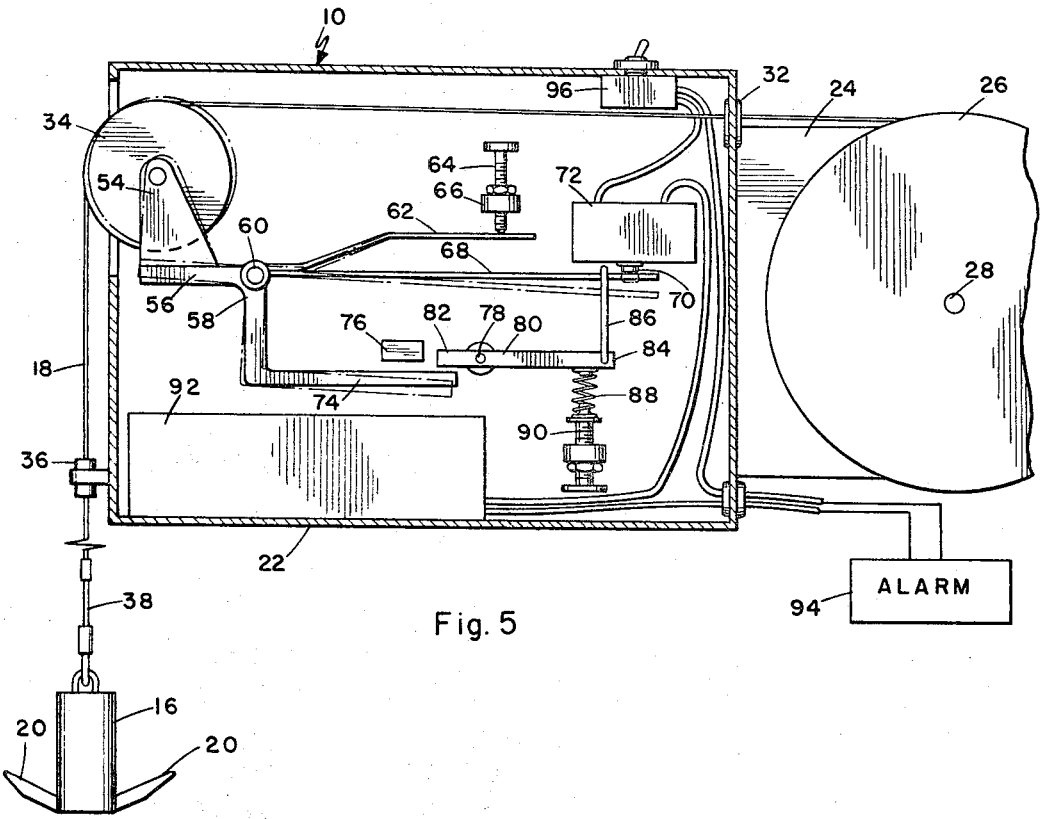
FIGURE 5 is a further enlarged side elevation view with the side panel cut away to reveal the mechanism, which is shown at rest and in one alarm position.

If the anchor 98 should break loose or be lost in any manner and the boat drifts into shallower water, the weight 16 will strike the bottom, as in the right hand portion of FIGURE 1, allowing line 18 to go slack. The reduction in load on pulley 34 will allow the pressure of leaf spring 62 to swing the bell crank and push spring arm 68 down, as in the broken line position in FIGURE 5. Button 70 is then free to extend and restore microswitch 72 to its normally on position, causing the alarm 94 to operate.

Figure 6:
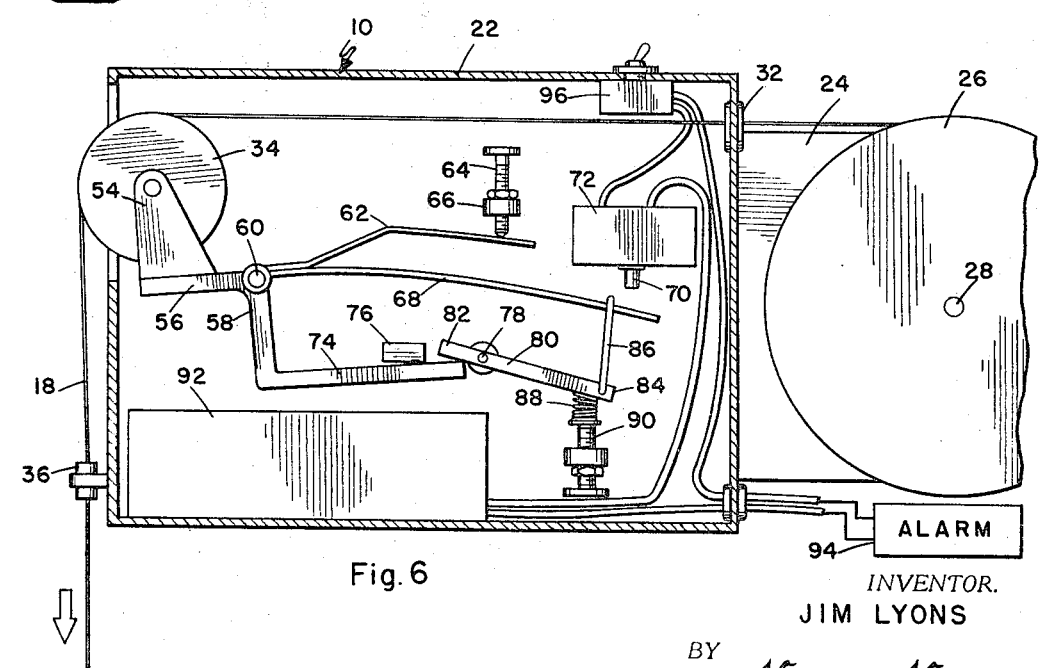
FIGURE 6 is a view similar to FIGURE 5, with the mechanism in a second alarm position.

If the flukes 20 on weight 16 should catch in an obstruction, also indicative of shallower water, the tension on line 18 will increase causing pulley 34 to be pulled down sufficiently to overcome the force of leaf spring 62. Bell crank arm 74 will swing up and contact the short end 82 of rocker arm 80, swinging the rocker arm until the stop 76 prevents further motion. Due to the mechanical advantage provided by the off-center pivot of the rocker arm 80, a small motion of the short end 82 will result in a large motion of the long end 84, so that link 86 will pull the spring arm 68 down sufficiently to release the microswitch button 70, as in FIGURE 6. Set screw 90 is adjusted so that a load substantially greater than that of the weight 16 itself is needed to overcome spring 88.

Either an increase or decrease in load on line 18 will thus operate the alarm. Screws 64 and 90 can be adjusted so that small changes in load caused by currents or wave action will be insufficient to trip the mechanism.

If the flukes 20 catch in an obstruction the continued drift of the boat will sustain a load on line 18, until the alarm is responded to and the drift is stopped. In this case the drum 26 will slip on the brake 46 and allow the line to pay out as needed to prevent damage to the apparatus. The pressure of spring 48 holding the brake 46 is such that the drum will slip under a reasonable load beyond that necessary to operate the alarm. If the line 18 is fully extended before the drift of the boat is stopped, and the load on the line becomes excessive, break link 38 will part to release the line without damaging the apparatus. Weight 16 is simple and easily replaceable if lost. Should the weight inadvertently be left in the water when the boat gets under way, the sudden inertia and drag of water on the weight will cause the alarm to operate as a reminder that the system is still active. The sensing unit and winch assembly can be weather-proofed in any suitable manner, or merely enclosed by a plastic bag or similar cover when in use.

It is understood that minor variation from the form of the invention disclosed herein may be made without departure from the spirit and scope of the invention, and that the specification and drawings are to be considered as merely illustrative rather than limiting.

I claim:
1. A drift indicator for an anchored boat, comprising:
   a sensing unit adapted for mounting on a boat;
   a flexible line connected to said sensing unit and having a weight thereon for suspension in the water below the boat;
   means to extend and retract said line to position said weight at a predetermined minimum depth in the water;
   switch means in said sensing unit;
   an alarm connected to said switch means;
   switch actuating mechanism coupled to said switch means;
   said line being attached to said actuating mechanism;
   said actuating mechanism being biased to a neutral position under static load of said weight and line and being operable by a change in load to actuate said switch means and operate said alarm.

2. A drift indicator according to claim 1, wherein said weight has flukes projecting therefrom.

3. A drift indicator according to claim 1, wherein said means to extend and retract the line includes a winch having a drum on which said line is wound, and brake means selectively frictionally engageable with said drum at a predetermined pressure which will allow the drum to slip under a pull on said line substantially in excess of that required to operate the alarm.

4. A drift indicator according to claim 1 and including a break link in said line adjacent said weight, said break link having a breaking strength substantially less than that of said line.

5. A drift indicator according to claim 1, wherein said switch actuating mechanism includes a bell crank pivotally mounted in said sensing unit;
   a pulley, over which said line passes, freely rotatably mounted on said bell crank;
   an arm extending from said bell crank and engaging said switch means to hold the switch means in an off position at the neutral position of said mechanism, said arm moving the switch means to an on position in either direction of swing of the bell crank.

6. A drift indicator according to claim 5, wherein said switch means is a normally on switch;
   said arm being held against said switch and holding the switch in off position by the static load of said weight and line;
   and a biasing spring coupled to said arm to urge the arm away from said switch with a pressure less than the static load of said weight and line.

7. A drift indicator according to claim 6 and including link means connected to said arm and coupled to said bellcrank to pull the arm away from said switch under increased load of said weight and line;
   and adjustable spring means connected to said link means to resist motion thereof with a pressure exceeding the static load of the weight and line.

References Cited

UNITED STATES PATENTS 2,810,120 10/1957 Parker _____ 340—29
3,217,291 11/1965 King _____ 340—29
3,281,781 10/1966 Milton _____ 340—29

JOHN W. CALDWELL, *Primary Examiner.*

ALVIN H. WARING, *Assistant Examiner.*

U.S. Cl. X.R.

200—61.18; 116—67; 114—206; 73—180